(12) United States Patent
Rosati

(10) Patent No.: US 9,944,346 B2
(45) Date of Patent: Apr. 17, 2018

(54) BICYCLE BRAKE

(71) Applicant: Campagnolo S.r.l., Vicenza (IT)

(72) Inventor: Stefano Rosati, Mira (VE) Venezia (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 15/196,649

(22) Filed: Jun. 29, 2016

(65) Prior Publication Data

US 2017/0001680 A1    Jan. 5, 2017

(30) Foreign Application Priority Data

Jun. 30, 2015   (IT) .............. UB2015A1792

(51) Int. Cl.
*B62L 1/16*   (2006.01)
*B62L 1/14*   (2006.01)

(52) U.S. Cl.
CPC .. *B62L 1/16* (2013.01); *B62L 1/14* (2013.01)

(58) Field of Classification Search
CPC ............... B62L 1/14; B62L 1/16; B62L 1/005
USPC .................. 188/24.13, 24.21, 24.22, 2 D
See application file for complete search history.

(56) References Cited

U.S. PATENT DOCUMENTS

| 5,913,386 A * | 6/1999 | Chen ................. | B62L 1/16 188/24.12 |
| 6,454,055 B1 * | 9/2002 | Coons .................. | B60T 1/06 188/24.12 |
| 6,874,601 B2 * | 4/2005 | Kuo .................... | B62L 1/005 188/24.22 |
| 7,182,180 B2 * | 2/2007 | Tsai .................... | B62L 1/14 188/2 D |
| 8,297,415 B2 * | 10/2012 | Edwards ............... | B62L 1/16 188/24.12 |
| 8,336,680 B2 * | 12/2012 | Nago .................. | B60T 1/14 188/24.12 |
| 8,342,295 B2 * | 1/2013 | Nago .................. | B62L 1/16 188/24.12 |
| 8,651,243 B2 * | 2/2014 | Nago .................. | B62L 1/16 188/24.12 |
| 8,651,245 B1 * | 2/2014 | Tsai .................... | B62L 1/06 188/2 D |

(Continued)

FOREIGN PATENT DOCUMENTS

CN    201189931 Y    2/2009

OTHER PUBLICATIONS

Italian Search Report and Written Opinion in Italian Application No. UB2015A001792 dated Feb. 15, 2016, with English translation.

*Primary Examiner* — Thomas W Irvin
(74) *Attorney, Agent, or Firm* — Volpe and Koenig, P.C.

(57) ABSTRACT

A bicycle brake including a pre-assembled assembly intended to be mounted on a bicycle frame through two fastening pins is disclosed. The brake includes a first lever and a second lever each having an actuation arm and a braking arm. A support element of the first lever and second lever includes a through hole coaxial to a first rotation axis (X1) of the first lever and a through hole coaxial to a second rotation axis (X2) of the second lever. A first hollow pin is provided with a longitudinal cavity for passage of a first fastening pin of the pre-assembled assembly to the bicycle frame. A second hollow pin is provided with a longitudinal cavity for passage of a second fastening pin of said pre-assembled assembly to the bicycle frame.

22 Claims, 9 Drawing Sheets

(56) References Cited

U.S. PATENT DOCUMENTS

| | | | |
|---|---|---|---|
| 8,739,940 B2* | 6/2014 | Nago | B60T 1/14 188/24.22 |
| 8,997,943 B2* | 4/2015 | Nago | B62L 1/16 188/24.12 |
| 9,446,814 B2* | 9/2016 | Kariyama | B62L 1/14 |
| 9,561,835 B2* | 2/2017 | Takachi | B62L 1/06 |
| 2005/0061587 A1* | 3/2005 | Tsai | B62L 1/16 188/24.14 |
| 2012/0222919 A1 | 9/2012 | Nago | |
| 2012/0222921 A1* | 9/2012 | Nago | B62L 1/16 188/24.21 |
| 2013/0333985 A1 | 12/2013 | Takachi et al. | |
| 2014/0041969 A1 | 2/2014 | Tsai | |
| 2016/0280318 A1* | 9/2016 | Wen | B62L 1/14 |
| 2017/0001681 A1* | 1/2017 | Rosati | B62L 1/14 |
| 2017/0036732 A1* | 2/2017 | Kakimoto | B62L 1/16 |

\* cited by examiner

BICYCLE BRAKE

CROSS REFERENCE TO RELATED APPLICATION

This application claims the benefit of Italian Application No. 102015000028976, filed on Jun. 30, 2015 and incorporated herein by reference as if fully set forth. The listed Italian Application No. 102015000028976 is also indicated as UB2015A001792 on the priority document provided by the Italian Patent Office due to a change in the numbering system within the Italian Patent Office.

FIELD OF INVENTION

The present invention relates to a bicycle brake. Preferably, such a brake is intended to be used in a racing bicycle.

BACKGROUND

The aforementioned brake can be mounted on a frame of the bicycle both at the front wheel (in particular, on the fork of the frame) and at the rear wheel.

Typically, bicycle brakes comprise two levers that support respective brake pads. The two levers are controlled so as to clamp the brake pads around the rim of the front/rear wheel, to brake it. The clamping of the pads takes place following the actuation by the cyclist of a control lever (usually arranged at the ends of the handlebars) with which an end of a sheathed cable (Bowden cable) is associated, the other end of the sheathed cable being associated with the two levers of the brake.

In particular, the brake of the present invention has a first lever having an actuation arm connected to an inner cable of the sheathed cable and a second lever having an actuation arm connected to a sheath of the sheathed cable.

Three types of brakes of this kind are known: with single rotation axis and single fastening pin (hereafter, brake of type A), with double rotation axis and single fastening pin (hereafter, brake of type B), and with double rotation axis and double fastening pin (hereafter, brake of type C).

In the brake of type A, both of the levers are articulated around a single central pin, which also acts as fastening pin to the frame of the bicycle. In such a brake a single rotation axis of the two levers is thus defined (at the central pin).

In the brake of type B, one of the two levers (usually the lever connected to the sheath of the sheathed cable) is articulated around a central pin that also acts as fastening pin to the frame of the bicycle, whereas the other lever (usually the lever connected to the inner cable of the sheathed cable) is articulated around a second pin fixed on a support body in turn fixed to the central pin. In such a brake two rotation axes are thus defined (at the two pins), only one of the pins (central pin) being associated with the frame of the bicycle.

In the brake of type C, each lever is articulated around a respective pin that also acts as fastening pin to the frame of the bicycle. In such a brake two rotation axes are thus defined (at the two pins), both of the pins being associated with the frame of the bicycle.

In all three of the aforementioned types of brakes, in the lever connected to the sheath of the sheathed cable, the attachment area to the aforementioned sheath (and therefore the actuation arm of such a lever) is arranged on the same side, with respect to the wheel, of the support area of the brake pad (and therefore of the braking arm of such a lever). Differently, in the lever connected to the inner cable of the sheathed cable, the attachment area to the aforementioned inner cable (and therefore the actuation arm of such a lever) is arranged on the opposite side, with respect to the wheel, of the support area of the brake pad (and therefore of the braking arm of such a lever).

Brakes of type A and B are disclosed, for example, by document WO 2007/063564 to the same Applicant.

Brakes of type C are available on the market and are indicated in general with the expression: "direct mount" brakes.

SUMMARY

The present invention relates to a brake intended to be mounted on the bicycle frame through two fastening pins (therefore a brake of type C).

The Applicant has observed that the mounting and dismounting operations of known brakes of type C onto and from the bicycle frame have some critical aspects.

In particular, in the mounting operations, the operator must fix each lever, through the respective fastening pins, on suitable blind holes provided on the frame of the bicycle. For this purpose, the operator must take care to keep the two levers in a desired relative position, such a desired relative position being that in which the distance between the first rotation axis and the second rotation axis is equal to the distance between the two blind holes provided on the bicycle frame.

The same care stated above should also be taken in the remounting operations of the brake on the frame of the bicycle, in the case in which it must be dismounted for maintenance.

The problem at the basis of the present invention is that of simplifying as much as possible the operations of mounting, and possibly dismounting and remounting, the brake on the frame of the bicycle.

In particular, the Applicant identified the problem of avoiding the operator having to also vary the position of the two levers to reach the aforementioned desired relative position, during the operations of mounting, and possibly dismounting and remounting, the brake onto the frame of the bicycle. The Applicant also identified the problem of limiting as much as possible the number of actions that the operator must perform during the operations of mounting, and possibly dismounting and remounting, the brake onto the frame of the bicycle.

The present invention therefore relates to a bicycle brake, comprising a pre-assembled assembly intended to be mounted on a bicycle frame through two fastening pins, wherein said pre-assembled assembly comprises:

a first lever having an actuation arm for the connection to an inner cable of a sheathed cable and a braking arm for supporting a first brake pad, said first lever being pivoted in a first rotation axis and comprising a first through hole coaxial to said first rotation axis;

a second lever having an actuation arm for the connection to a sheath of the sheathed cable and a braking arm for supporting a second brake pad, said second lever being pivoted in a second rotation axis distinct and substantially parallel to the first rotation axis, said second lever comprising a second through hole coaxial to said second rotation axis;

a support element of said first lever and second lever, said support element comprising a third through hole coaxial to said first rotation axis and a fourth through hole coaxial to said second rotation axis;

a first hollow pin housed in said first through hole and in said third through hole and provided with a longitudinal cavity for the passage of a first fastening pin of said pre-assembled assembly to the bicycle frame;
a second hollow pin housed in said second through hole and in said fourth through hole and provided with a longitudinal cavity for the passage of a second fastening pin of said pre-assembled assembly to the bicycle frame.

BRIEF DESCRIPTION OF THE DRAWINGS

Further features and advantages of the invention will become clearer from the description of some preferred embodiments, made with reference to the attached drawings, where.

DETAILED DESCRIPTION OF THE PREFERRED EMBODIMENTS

Figure 1:
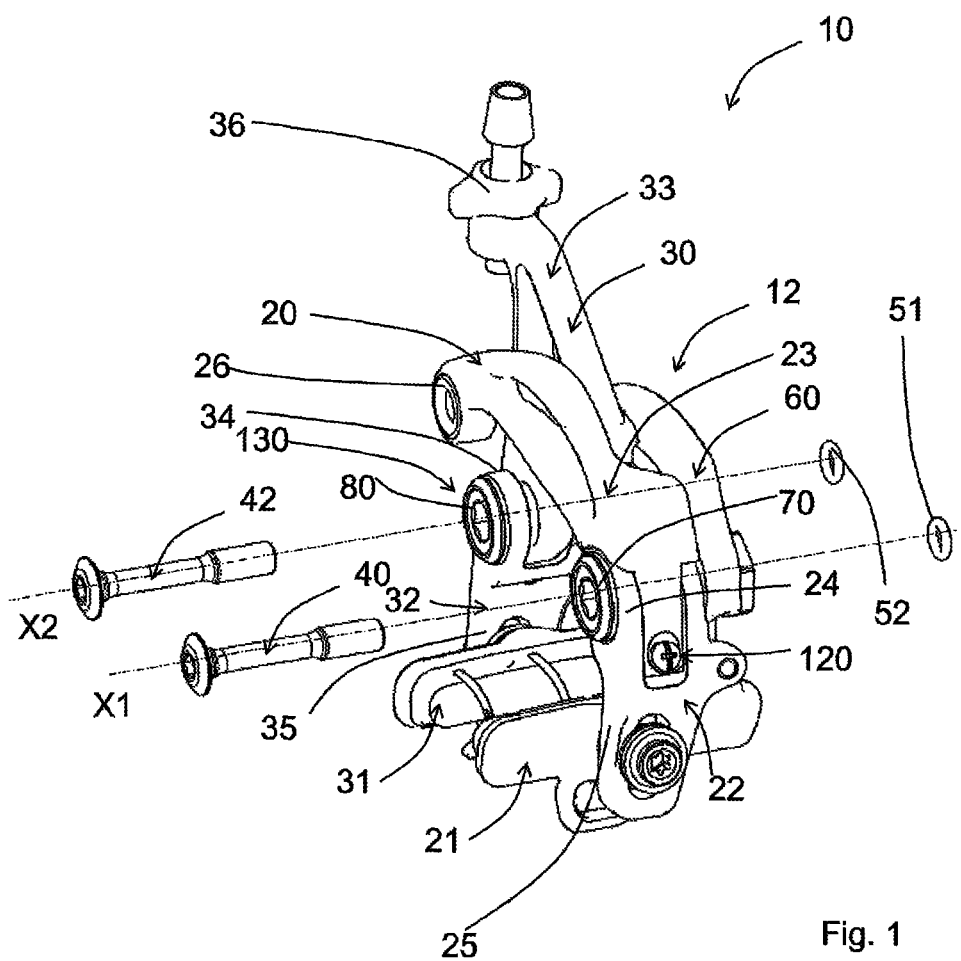
FIG. 1 is a perspective view of a first embodiment of the bicycle brake according to the invention (in particular it is a front brake)
Figure 2:
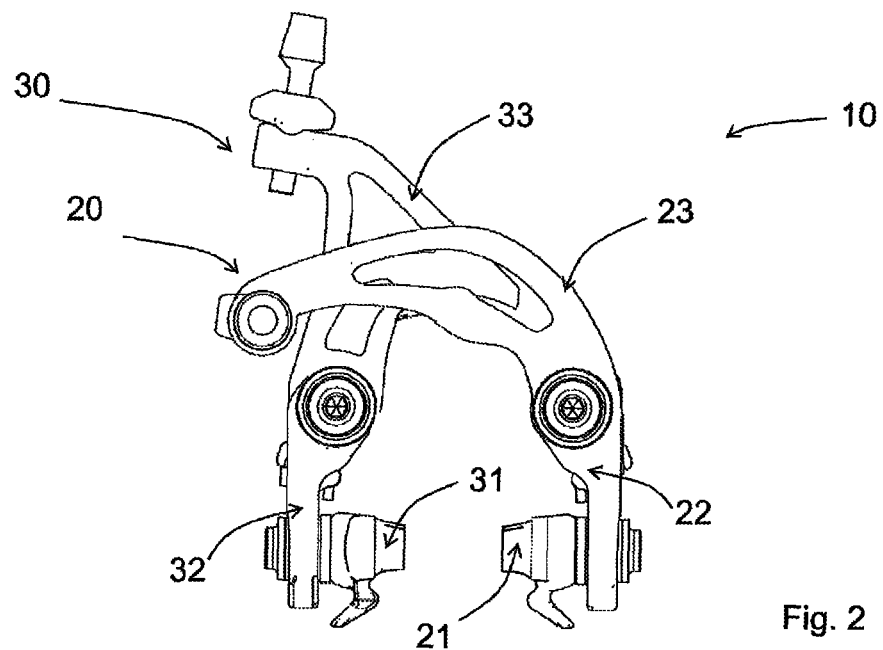
FIG. 2 is an anterior front view of the brake of FIG. 1.

In the present description and in the subsequent claims, the expression "pre-assembled assembly" means an assembly already assembled by a supplier and that is used as such by an operator during the mounting of the brake onto the frame of the bicycle. In other words, the pre-assembled assembly is substantially already ready to be mounted onto the frame of the bicycle, without the operator having to perform on it further assembly/disassembly operations of the components that constitute the pre-assembled assembly.

Advantageously, the bicycle brake of the invention makes it possible to drastically simplify the operations of mounting, and possibly dismounting and remounting, the brake onto the frame of the bicycle.

Indeed, in the brake of the invention the adjustment of the relative position of the two levers to reach the desired relative position is carried out by the supplier and is maintained, before mounting and after dismounting, by the two hollow pins housed in the respective coaxial holes of the levers and of the support element. In the mounting operations the operator must therefore simply take the pre-assembled assembly from the package, position it on the frame of the bicycle aligning the hollow pins with the blind holes provided on the frame of the bicycle and fix it through the two fastening pins, without carrying out any preventive adjustment of the relative position of the levers. The operator can then with one hand position the pre-assembled assembly on the frame and, with the other hand, fix the pre-assembled assembly through the two fastening pins.

The fact that the support element stays associated with the two levers after the brake is mounted on the frame of the bicycle also ensures an easy dismounting and remounting of the brake by the operator, for example to carry out maintenance operations. Indeed, the operator can quickly dismount and remount the brake, removing and repositioning the pre-assembled assembly, without worrying about carrying out any new adjustment of the relative position of the two levers.

The provision of hollow pins allows the passage of the fastening pins in the longitudinal cavities of the hollow pins during the mounting of the brake onto the frame of the bicycle, without altering the desired relative position of the two levers.

The bicycle brake of the present invention can comprise one or more of the following preferred characteristics, taken individually or in combination.

Preferably, the first hollow pin is rotatably housed in said first through hole and the second hollow pin is rotatably housed in said second through hole.

In this way, the first and the second lever can rotate with respect to the hollow pins when the brake is actuated.

Preferably, each of said first hollow pin and second hollow pin comprises, at a first free end portion, a head in axial abutment against said first lever and said second lever, respectively, and, at an opposite free end portion thereof, an external threading engaged in an internal threading formed in said third through hole and fourth through hole, respectively.

Advantageously, the screwing of the hollow pins onto the support element makes it possible to connect the support element to the two levers of the pre-assembled assembly, so as to obtain the packing of the various components that constitute the pre-assembled assembly and, therefore, the final assembly of the pre-assembled assembly.

Preferably, said pre-assembled assembly comprises:
a first hollow nut screwed onto the external threading of said first hollow pin;
a second hollow nut screwed onto the external threading of said second hollow pin.

The hollow nuts ensure a better assembly of the components that constitute the pre-assembled assembly. Moreover, the fact that the nuts are hollow allows the fastening pins to pass inside the hollow nuts during the mounting of the brake onto the frame of the bicycle, without altering the desired relative position of the two levers.

Preferably, said pre-assembled assembly comprises at least one elastic element arranged pre-loaded between said support element and said first and second hollow nuts and active in thrust on said first lever and second lever.

Advantageously, such an elastic element is firmly held in position in the pre-assembled assembly by the support element and by the two hollow nuts and it can effectively perform its action on the levers of the brake during the braking and the subsequent release of the control lever of the brake by the cyclist.

Preferably, said at least one elastic element is at least partially housed in said support element.

In this way, the elastic element is in a protected and not easily accessible position, minimising the risk of the operator being able to unintentionally imparting undesired rotations on the two levers during the mounting of the brake onto the frame of the bicycle.

Preferably, said at least one elastic element is defined by a single elastic element having a first portion arranged coaxially to said first rotation axis, a second portion arranged coaxially to said second rotation axis and an intermediate portion that connects said first portion and second portion.

Advantageously, the use of a single elastic element facilitates the assembly operations of the pre-assembled assembly.

More preferably, said single elastic element comprises a first end portion active in thrust against the braking arm of said first lever in a direction away from the braking arm of said second lever and a second end portion active in thrust against the braking arm of said second lever in a direction away from the braking arm of said first lever.

Advantageously, the thrusting action of the elastic element on the two levers of the brake is in this way exerted at the braking arms of the two levers.

Preferably, said pre-assembled assembly has a predetermined axial clearance between said support element and said first lever and second lever.

Such an axial clearance is predetermined so that in the pre-assembled assembly the friction between the support element and the two levers is sufficient to counter the action of the elastic element on the actuation arms of the two levers when the brake is not activated (such an action would tend to move the braking arms of the two levers apart from each other), so as to maintain the desired relative position between the two levers, without however obstructing the mutual approach of the two braking arms when the brake is activated.

Preferably, said fastening pins are at least partially housed in said first through hole and second through hole, respectively.

In this way, an even greater simplicity of mounting of the brake onto the frame of the bicycle is advantageously obtained. The operator, indeed, only has to align the through holes of the two levers with the blind holes of the frame of the bicycle (using a single hand) and screw the fastening pins into the blind holes (using the other hand).

Preferably, the braking arm of each of said first lever and second lever is made in a distinct piece from the respective actuation arm of each of said first lever and second lever.

More preferably, the pre-assembled assembly comprises, for each of said first lever and second lever, means for adjusting the angular position of said braking arm with respect to said actuation arm.

It is thus possible to adjust the position of each braking arm with respect to the respective actuation arm. Such adjustment allows each brake pad to be positioned in the desired position with respect to the wheel without altering the desired relative position of the two levers.

Preferably, each actuation arm comprises a threaded through hole in which a screw is screwed, having a head projecting with respect to said actuation arm and an opposite end surface in abutment against the braking arm, so that a screwing/unscrewing action of said screw with respect to said threaded through hole causes a variation of the position of said braking arm with respect to said actuation arm.

In this way the operator or the cyclist, seeing the head of the screw during the adjustment operations of the position of the braking arm with respect to the actuation arm, has an excellent perception of the position of the screw with respect to the actuation arm. In this way the screw is prevented from being unintentionally unscrewed too much, during the unscrewing of the screw from the threaded through hole, until it is totally unthreaded from the threaded through hole, with the risk of it falling and/or being lost.

Moreover, in the case of damage of the screw, it is easily replaceable, without having to dismount the brake.

Preferably, each actuation arm comprises, at said threaded through hole, a seat for partially housing said head, said seat having a flattened bottom surface from which said threaded through hole begins.

The head of the screw can abut on such a flattened bottom surface, when it is at the end of its screwing stroke. The aforementioned flattened bottom surface therefore determines an end-of-stroke position of the screw.

Preferably, said flattened bottom surface is inclined with respect to a vertical plane, with reference to the mounting position of said brake on said bicycle frame.

In particular, the aforementioned flattened bottom surface is oriented perpendicularly to the longitudinal axis of said threaded through hole and so that the operator or the cyclist can act on the head of the screw from above, thus taking up a comfortable position.

Preferably, said actuation arm and said braking arm have respective first mutual abutment surfaces intended to go into abutment following the screwing action of said screw with respect to said threaded hole.

The provision of the first mutual abutment surfaces makes it possible to prevent the screwing end-of-stroke condition of the screw from being defined by the abutment of the head of the screw against the flattened bottom surface of the actuation arm, thus avoiding having to screw the screw excessively into the threaded through hole.

Preferably, said actuation arm and said braking arm have respective second mutual abutment surfaces intended to go into abutment following the unscrewing action of said screw with respect to said threaded hole. More preferably, the second abutment surfaces are arranged on opposite side to the first abutment surfaces with respect to the screw.

The provision of the aforementioned second mutual abutment surfaces makes it possible to define an unscrewing end-of-stroke condition of the screw, thus preventing the screw from being able to be totally unthreaded, and thus being able to fall and be lost, during the unscrewing of the screw from the respective threaded through hole.

In the attached figures, reference numeral 10 indicates a bicycle brake according to the present invention.

The brake 10 comprises two rotation axes X1, X2 and two fastening pins 40, 42, i.e. it is a brake of type C discussed above.

The brake 10 is mounted—through the two fastening pins 40, 42—onto the bicycle frame at the front wheel or rear wheel. In particular, the brake 10 of FIGS. 1-8 is mounted at the front wheel, in particular on the front fork of the frame. The brake 10 of FIGS. 9, 10, on the other hand, is mounted at the rear wheel.

With reference to FIGS. 1-8, the brake 10 comprises a first lever 20 pivoted at the rotation axis X1 and rotatable about the fastening pin 40, and a second lever 30 pivoted at the rotation axis X2 and rotatable about the fastening pin 42.

The rotation axes X1, X2 are substantially parallel.

The fastening pins 40, 42 are fixed in respective blind holes 51, 52 provided on the frame of the bicycle. FIG. 1 shows the two blind holes 51, 52, but not also the frame of the bicycle.

The two levers 20, 30 support respective brake pads 21, 31.

The two levers 20, 30 are controlled so as to clamp the brake pads 21, 31 around the rim (not shown) of the wheel of the bicycle, to brake it.

The clamping of the pads 21, 31 takes place following the actuation by the cyclist of a control lever (not shown)

usually arranged at the ends of the handlebars of the bicycle and with which an end of a sheathed cable (not shown) is associated.

The sheathed cable is a substantially inextensible Bowden cable, having an inner cable sheathed in a sheath.

The brake 10 comprises a roller 29 for mutual coupling of the levers 20, 30. The roller 29 is pivoted to the lever 20 at a pivoting axis X3. The roller 29 is in rolling contact with a surface portion 39 of the lever 30. Alternatively, the roller 29 could be pivoted on the lever 30 and be in rolling contact with a surface portion of the lever 20.

When the lever 20 rotates around the first rotation axis X1 the roller 29 pushes the lever 30 in rotation around the rotation axis X2. During this rotation the roller 29 rolls on the surface portion 39 of the lever 30.

The first lever 20 has an actuation arm 23 connected to the inner cable of the sheathed cable and the second lever 30 has an actuation arm 33 connected to the sheath of the sheathed cable. Each actuation arm 23, 33 extends from an articulation area 24, 34 of the lever 20, 30 to an attachment area 26, 36 of the inner cable/sheath of the sheathed cable.

Each lever 20, 30 also has a braking arm 22, 32 on which the respective pad 21, 31 is mounted. Each braking arm 22, 32 extends from an articulation area 24, 34 of the lever 20, 30 to a support area 25, 35 of the brake pad 21, 31.

In the second lever 30, the attachment area 36 to the aforementioned sheath (and therefore the actuation arm 33) is arranged on the same side, with respect to the wheel, of the support area 35 of the brake pad 31 (and therefore of the braking arm 32). Differently, in the first lever 20, the attachment area 26 to the aforementioned inner cable (and therefore the actuation arm 23) is arranged on the opposite side, with respect to the wheel, of the support area 25 of the brake pad 21 (and therefore of the braking arm 22).

The braking arm 22, 32 of the levers 20, 30 is made in a distinct piece from the respective actuation arm 23, 33. In particular, the braking arm 22, 32 is articulated to the respective actuation arm 23, 33 at the rotation axis X1, X2 of the respective lever 20, 30.

Figures 5, 6:
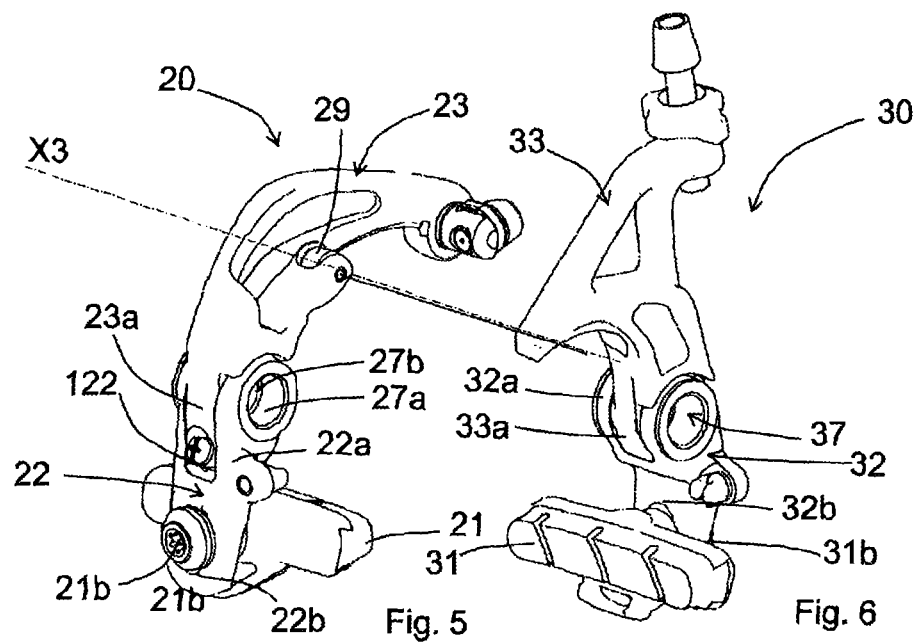
FIG. 5 is a perspective view of a first lever of the brake of FIG. 1.
FIG. 6 is a perspective view of a second lever of the brake of FIG. 1.
Figure 7:
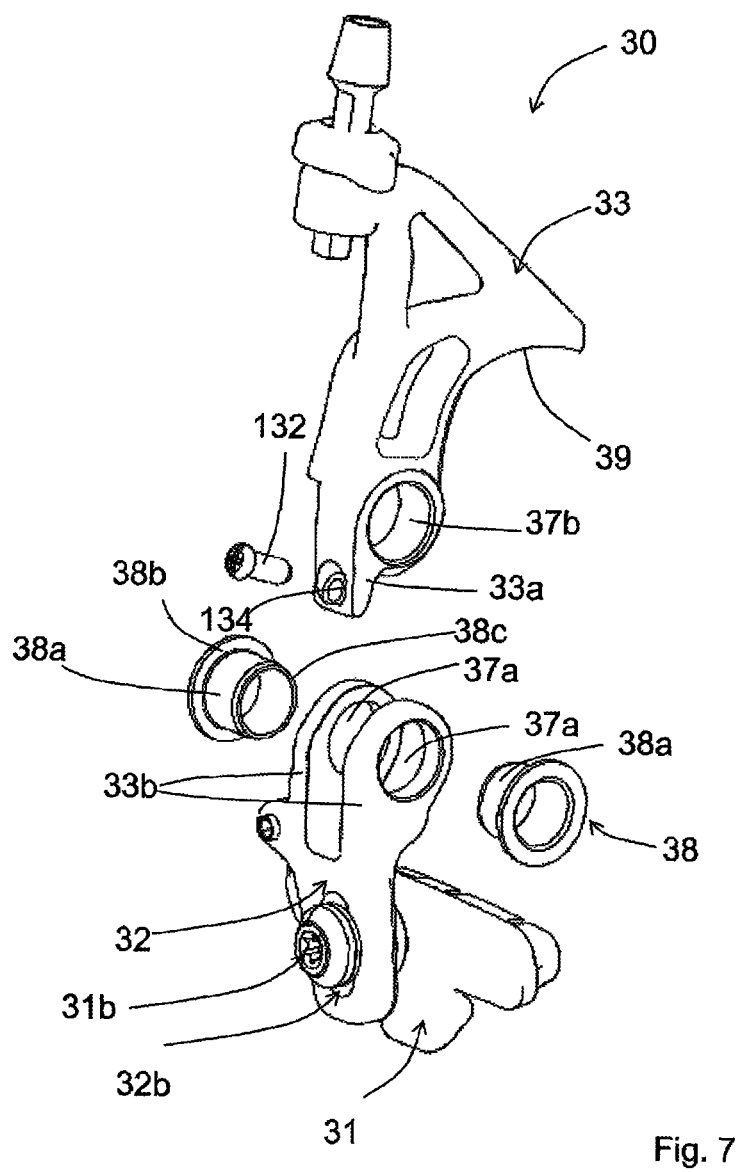
FIG. 7 is an exploded perspective view of the lever of FIG. 6.

In particular, as illustrated in FIGS. 5-7, the braking arms 22, 32 have a forked portion 22a, 32a provided with coaxial through holes 27a, 37a.

The actuation arms 23, 33 have an appendix 23a, 33a provided with a through hole 27b, 37b.

The appendix 23a, 33a is inserted into the forked portion 22a, 32a so as to make coaxial the through holes 27a and 27b (thus forming the through hole 27 of the lever 20) and the through holes 37a and 37b (thus forming the through hole 37 of the lever 30).

The braking arms 22, 32 comprise a slot 22b, 32b in which a pin 21a, 31a associated with the brake pad 21, 31 is inserted. The pin 21a, 31a can be fixed at various heights in the slot 22b, 32b so as to adjust the position in height of the brake pad 21, 31 with respect to the braking track of the rim of the wheel.

In each lever 20, 30 means 120, 130 are provided for adjusting the angular position of the braking arm 22, 32 with respect to the actuation arm 23, 33. Such adjustment means 120, 130 will be described later on.

The brake 10 also comprises a support element 60 of the levers 20, 30.

The levers 20, 30 are mounted on the support element 60 through respective hollow pins 70, 80.

Figure 4:
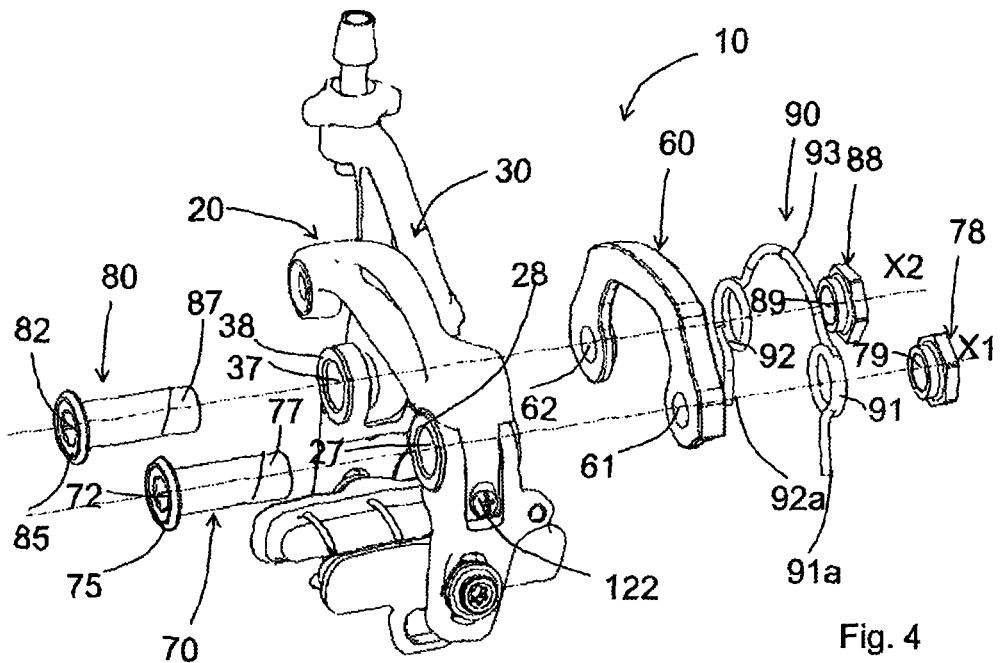
FIG. 4 is an exploded perspective view of the brake of FIG. 1.

In particular, as illustrated in FIG. 4, the hollow pin 70 is housed in a through hole 27 formed in the lever 20 coaxially to the rotation axis X1 and in a through hole 61 formed in the support element 60 again coaxially to the rotation axis X1.

The hollow pin 80 is housed in a through hole 37 formed in the second lever 30 coaxially to the rotation axis X2 and in a through hole 62 formed in the support element 60 again coaxially to the rotation axis X2.

Each hollow pin 70, 80 is provided with a respective longitudinal cavity 72, 82 for the passage of the respective fastening pin 40, 42.

In the preferred embodiment of the brake 10, the hollow pins 70, 80 are rotatably housed in the through holes 27, 37. In this case, sliding bushes 28, 38 are stably mounted (for example by interference) in the through holes 27, 37. The sliding bushes 28, 38 are thus radially interposed between the through holes 27, 37 and the hollow pins 70, 80 and also perform the function of constraining the braking arms 22, 32 to the articulation arms 23, 33.

Between the bushes 28, 38 and the hollow pins 70, 80 a coupling with clearance is provided, so that the levers 20, 30 (with which the bushes 28, 38 are integral) can rotate about the hollow pins 70, 80.

As shown in FIG. 7, the bush 38 comprises two parts 38a that are inserted into the through hole 37 from opposite sides. Each part 38a comprises a head 38b in axial abutment against the lever 30.

The ends 38c of the two parts 38a opposite the head 38b may or may not be in contact with each other when the two parts 38a are inserted into the through hole 37.

In the case in which the ends 38c are not in contact with each other, between the two parts 38a a further bush (not illustrated) can be interposed.

The bush 28 is also made in two or three parts, similarly to the bush 38.

With particular reference to FIG. 4, the hollow pins 70, 80 comprise, at a first free end portion, a head 75, 85 in axial abutment against the lever 20, 30, and at an opposite free end portion, an external threading 77, 87 engaged in an internal threading formed in the through holes 61, 62 of the support element 60.

Thanks to the configuration described above, it is possible to ensure that between the support element 60 and the levers 20, 30 there is a predetermined axial clearance. This clearance is determined by the extent of the screwing of the external threading 77, 87 of the hollow pins 70, 80 on the internal threading of the through holes 61, 62 of the support element 60. In particular, it is preferred to adjust such axial clearance so as to prevent the support element 60 from being in strong axial abutment on the levers 20, 30, so as not to obstruct the free rotation of the levers 20, 30 around the rotation axes X1, X2 during the braking.

The external threading 77, 87 of each of the free end portions of the hollow pins 70, 80 is also screwed into a respective hollow nut 78, 88.

Each hollow nut 78, 88 is provided with a respective longitudinal cavity 79, 89 for the passage of the respective fastening pin 40, 42.

Between the support element 60 and the hollow nuts 78, 88 an elastic element 90 is interposed.

The elastic element 90 is mounted in a preload condition so as to act in thrust on the levers 20, 30.

Figure 3:
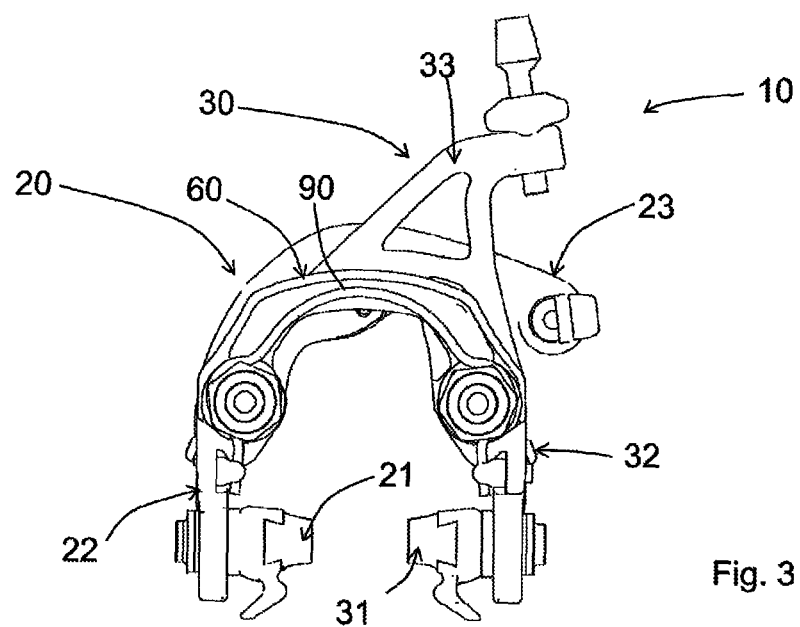
FIG. 3 is a posterior front view of the brake of FIG. 1.

As shown in FIGS. 3 and 4, the elastic element 90 is housed, with the exception of its opposite end portions, in the support element 60.

The elastic element 90 comprises a first portion 91 arranged coaxially to the rotation axis X1, a second portion 92 arranged coaxially to the rotation axis X2, an intermediate portion 93 that connects the first portion 91 to the second portion 92, a first end portion 91*a* arranged on opposite side to the intermediate portion 93 with respect to the first portion 91 and active in thrust against the braking arm 22 of the lever 20 in a direction away from the braking arm 32 of the lever 30, and a second end portion 92*a* arranged on opposite side to the intermediate portion 93 with respect to the second portion 92 and active in thrust against the braking arm 32 of the lever 30 in a direction away from the braking arm 22 of the lever 20.

The mutual approach of the brake pads 21, 31 during the braking is achieved, following the command imparted by the cyclist on the control lever arranged on the bicycle handlebars, through the effect of a thrust stress exerted by the braking arms 22, 32 on the end portions 91*a*, 92*a* of the elastic element 90.

In the preferred embodiment described above, the assembly including the levers 20, 30, the support element 60, the hollow pins 70, 80, the nuts 78, 88 and the elastic element 90 is a pre-assembled assembly 12 that is assembled by the supplier of the brake 10 and that is mounted by an operator onto the frame of the bicycle through the two fastening pins 40, 42.

The fastening pins 40, 42 can be part of the pre-assembled assembly 12. In this case, the brake 10 provided by the supplier has the fastening pins 40, 42 at least partially housed in the longitudinal cavities 72, 82 of the hollow pins 70, 80 present in the through holes 27, 37.

Figure 8:
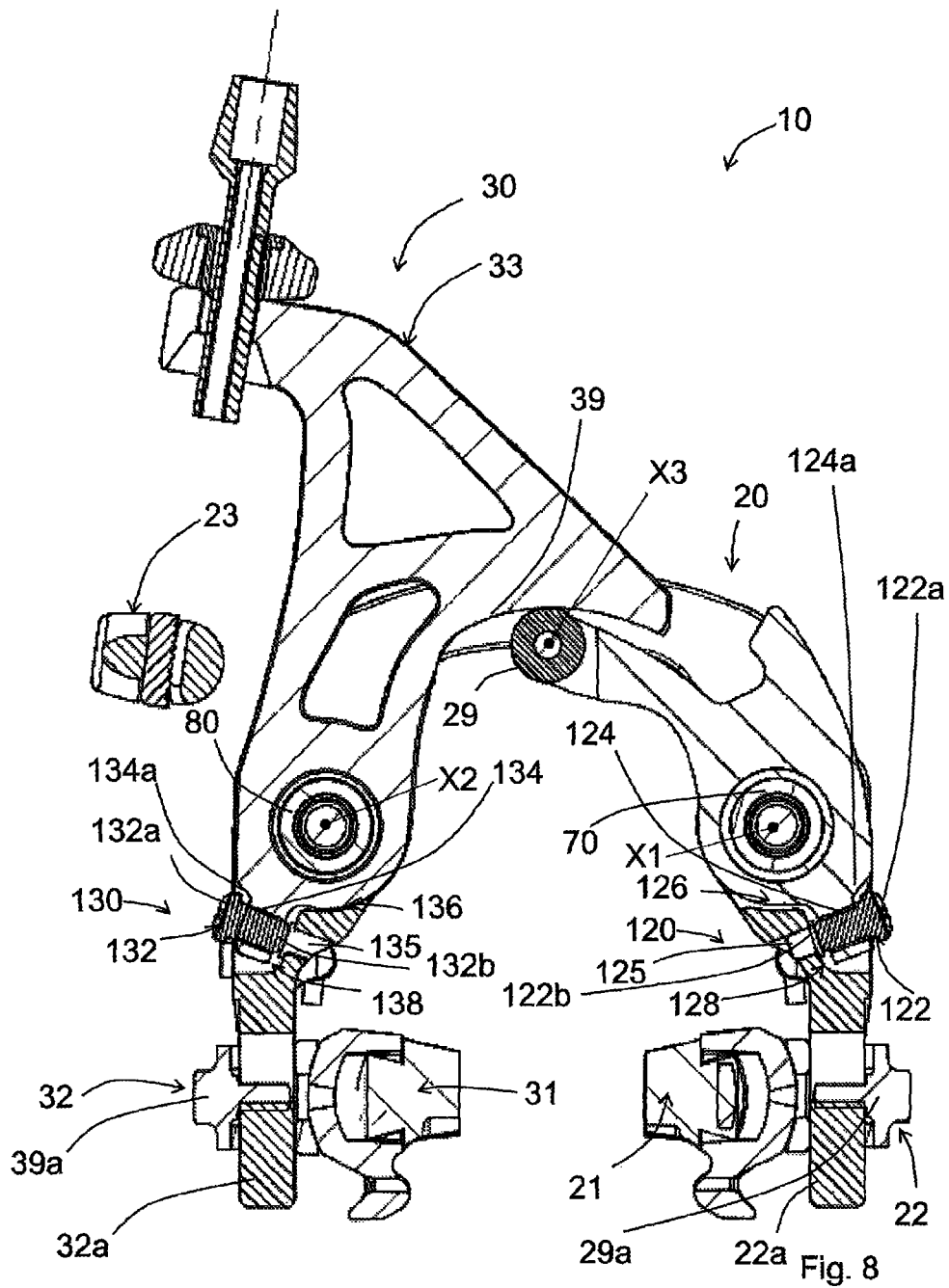
FIG. 8 is a cross section view of the brake of FIG. 1.

With particular reference to FIG. 8, the means 120, 130 for adjusting the angular position of the braking arm 22, 32 of the levers 20, 30 with respect to the actuation arm 23, 33 will now be described.

The adjustment means 120, 130 comprise a screw 122, 132 screwed into a threaded through hole 124, 134 formed in the actuation arms 23, 33.

Each screw 122, 132 has a head 122*a*, 132*a* projecting with respect to the actuation arm 23, 33 and an opposite end surface 122*b*, 132*b* in abutment against the braking arm 22, 32, so that a screwing/unscrewing action of the screw 122, 132 with respect to the threaded through hole 124, 134 causes a variation of the position of the braking arm 22, 32 with respect to the actuation arm 23, 33.

In the embodiment illustrated here, each braking arm 22*a*, 32*a*, at the threaded through hole 124, 134 of the actuation arm 23, 33, has a hole into which a plug 125, 135 is inserted that is provided with a head on which the end surface 122*b*, 132*b* of the screw 122, 132 acts in abutment.

Each actuation arm 23, 33, at the threaded through hole 124, 134, comprises a seat 124*a*, 134*a* for partially housing the head 122*a*, 132*a* of the screw 122, 132. The seat 124*a*, 134*a* has a flattened bottom surface from which the threaded through hole 124, 134 begins.

The flattened bottom surface is inclined with respect to a vertical plane, with reference to the mounting position of the brake 10 on the frame 50.

The actuation arm 23, 33 and the braking arm 22, 32 have respective first surfaces 126, 136 intended to go into mutual abutment following the screwing action of the screw 122, 132 with respect to the threaded hole 124, 134.

In the operative configuration illustrated in FIG. 8, the relative position between braking arm 32 and actuation arm 33 is such that the surfaces 136 are in mutual abutment, thus defining a end-of-stroke condition, in screwing, of the screw 132 into the threaded hole 134. The relative position between braking arm 22 and actuation arm 23, on the other hand, is such that the surfaces 126 are not yet in mutual abutment, thus defining a condition that still allows a relative movement of the braking arm 22 with respect to the actuation arm 23 following a further screwing of the screw 122 into the threaded hole 124.

The actuation arm 23, 33 and the braking arm 22, 32 can also have, on opposite side to the first surfaces 126, 136 with respect to the screw 122, 132, respective second surfaces 128, 138 intended to go into mutual abutment following the unscrewing action of the screw 122, 132 with respect to the threaded hole 124, 134.

Figure 9:
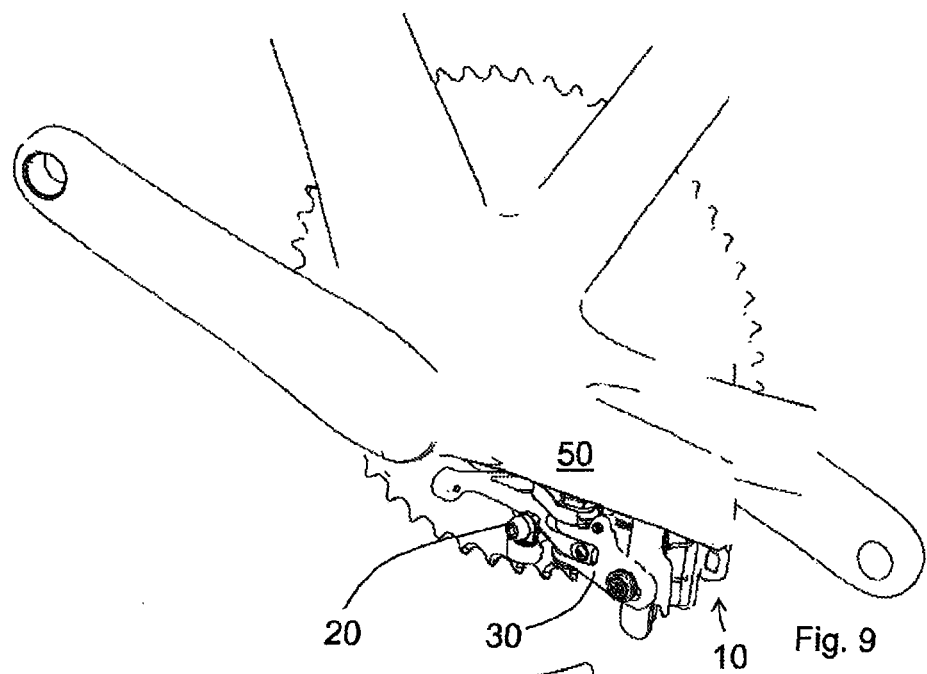
FIG. 9 is a perspective view of a second embodiment of the bicycle brake according to the invention (in particular it is a rear brake), mounted on a bicycle frame.
Figure 10:
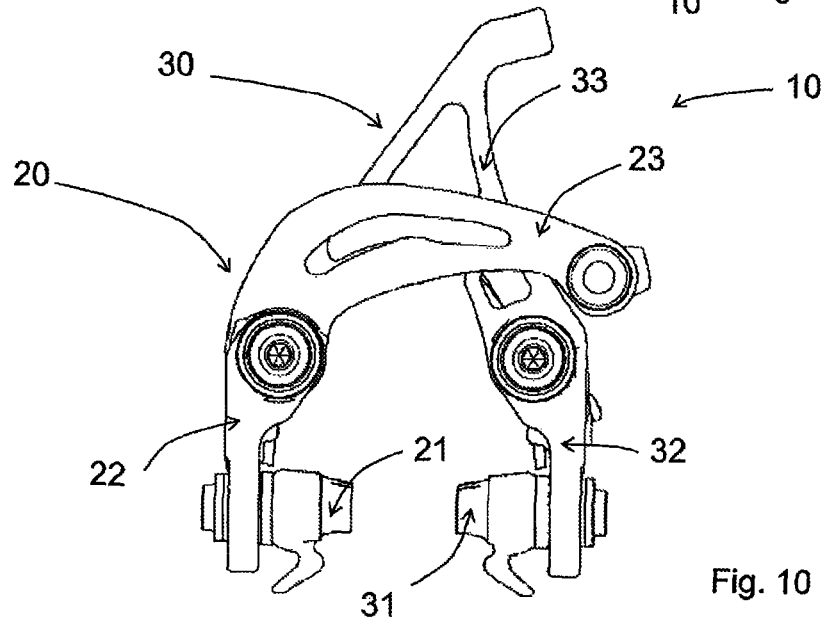
FIG. 10 is an anterior front view of the brake of FIG. 9.

The brake 10 of FIGS. 9 and 10 has the same features described above with reference to the brake of FIGS. 1-8. FIG. 9 shows in particular the positioning of the brake 10 on a portion 50 of the bicycle frame near the housing box of the bottom bracket assembly of the bicycle.

As already stated, the brake 10 is provided pre-assembled by the supplier. In particular, the supplier provides the operator with the pre-assembled assembly described above.

In mounting the brake 10 onto the frame of the bicycle the operator only has to position the pre-assembled assembly 12 by aligning the hollow pins 70, 80 with the blind holes 51, 52 provided on the frame of the bicycle. The pre-assembled assembly is thus fixed onto the bicycle frame through the fastening screws 40, 42.

The relative position of the levers 20, 30 is set by the supplier.

If desired, by intervening on the screws 122, 132, the operator can carry out a differentiated adjustment of the brake pads 21, 31 with respect to the rim without altering the relative position of the levers 20, 30.

The operator thus fixes the inner cable of the sheathed cable in the attachment area 26 of the lever 20 and the sheath of the sheathed cable in the attachment area 36 of the lever 30.

The operator can adjust the relative position of the levers 20, 30, after the mounting of the brake 10 on the frame of the bicycle, by intervening on the attachment area 36 of the lever 30.

In operation, the traction of the inner cable of the sheathed cable, in response to the actuation by the cyclist of the control lever, causes the mutual approach of the brake pads 21, 31 making the levers 20, 30 rotate about the rotation axes X1, X2 until the brake pads 21, 31 clamp on the respective braking tracks formed on the rim of the wheel, countering the elastic thrust exerted on the levers 20, 30 by the elastic element 90. In this way, the braking is obtained.

Once the actuation of the control lever ends, the elastic element 90 pulls the levers 20, 30 back towards the rest position in which the brake pads 21, 31 are spaced apart each other and therefore do not rest on the rim of the wheel.

With particular reference to FIG. 8, the surface portion 39 of the second lever 30 is shown where the roller 29 is in rolling contact.

The surface portion 39 has a profile that is constructed through a reverse construction method suitable for ensuring that to each rotation of the first lever 20 about the first rotation axis X1 by a predetermined angle, a rotation of the second lever 30 about the second rotation axis X2 by an angle substantially equal to such a predetermined angle corresponds (substantially equal in absolute value, but in reverse direction of rotation). This is so as to minimise as much as possible the difference in movement of the two brake pads 21, 31 during the braking, obtaining substantially the same braking force on the two braking tracks and a temperature of the two braking tracks that is also substantially equal.

The profile of the surface portion 39 is defined as function of the position taken by the roller 29 following the rotation of the roller 29 itself about the rotation axis X1 by a respective predetermined angle of rotation and the rotation of the roller 29 itself about the rotation axis X2 by a respective angle substantially equal to the aforementioned respective predetermined angle of rotation.

In particular, the aforementioned profile is defined by a curve that passes by a predetermined number of points that will constitute tangency points of the lever 30 to the roller 29 during the rotation of the lever 20 (and therefore of the roller 29) about the rotation axis X1 and of the lever 30 about the rotation axis X2.

FIGS. 11-16 show, in sequence, the construction of the curve that defines the profile of the surface portion 39 of the second lever 30 through the aforementioned reverse construction method.

Figure 11:
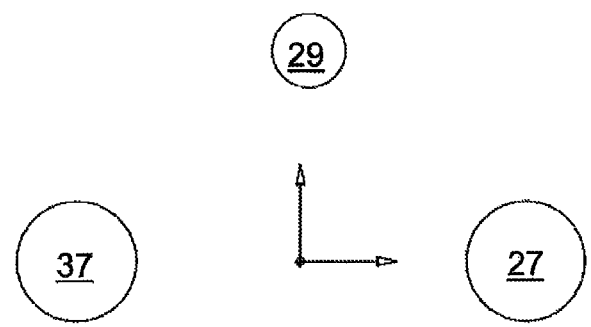
FIGS. 11-16 show, in sequence, construction schemes of a profile of a surface portion of the lever of FIG. 6.

FIG. 11 schematizes the positions taken by the roller 29 and by the support areas 25, 35 of the brake pads 21, 31 (and therefore by the braking arms 22, 32) with respect to the two through holes 27, 37 of the two levers 20, 30, in an initial reference configuration of the pre-assembled assembly 12. Such positions correspond to those taken in the rest condition of the brake, i.e. when the control lever of the brake is not actuated. In such a configuration, the roller 29 is in a reference position with respect to the rotation axis X1.

The method for constructing the profile of the surface portion 39 of the lever 30 comprises, once the lever 20 has been defined and constructed, the step of imparting to the lever 20 (and therefore to the roller 29 associated therewith) a predetermined number of rotations about the rotation axis X1 by rotating, on each occasion, the lever 20 (and therefore the roller 29 associated therewith) by a respective predetermined angle of rotation.

Figure 12:
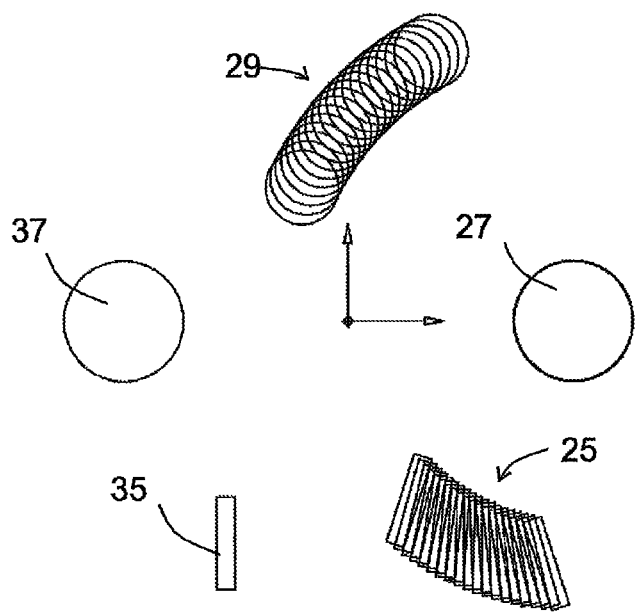

FIG. 12 shows the positions taken by the roller 29 at the aforementioned rotations, for example whenever the lever 20 is rotated both in clockwise direction and in anti-clockwise direction by 1° up to a total angle of +1-10°, starting from the initial configuration shown in FIG. 11.

In the non-limiting example of FIG. 12, the number of rotations in clockwise direction is equal to the number of rotations in anti-clockwise direction.

FIGS. 12-16 show the positions taken by the support area 25 of the lever 20 at the aforementioned rotations.

Figure 13:
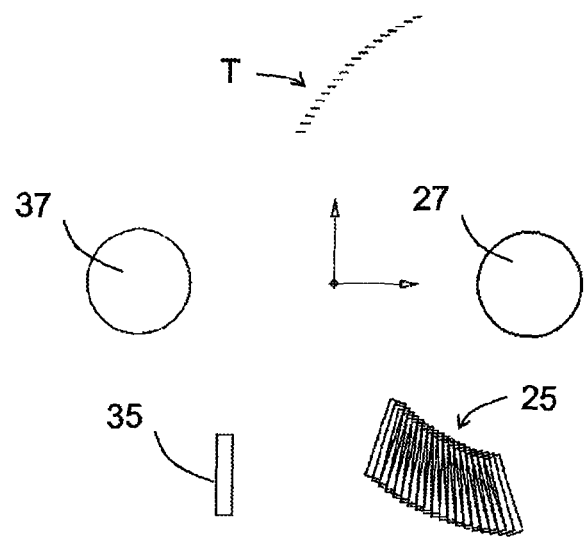

As illustrated in FIG. 13, at each of the positions taken by the roller 29 a reference point of the roller 29 is identified. In the example illustrated in FIGS. 11-16, the reference point is a top point of the roller 29, corresponding to the highest point of the roller 29 when the brake 10 is mounted on the frame 50 of the bicycle in use position.

The initial reference point of the roller 29 coincides with an initial contact point of the roller 29 with the lever 30 when the roller 29 is in the aforementioned reference position with respect to the rotation axis X1. Such a point is therefore a first point of the curve that defines the profile of the surface portion 39 of the lever 30.

Each further point of the aforementioned curve is identified by a corresponding further reference point of the roller 29. Such a further reference point coincides with the point in which the aforementioned initial reference point goes to be positioned when the roller 29 has rotated about the rotation axis X1 by the respective predetermined angle of rotation, starting from the reference position, and the roller 29 has rotated about the rotation axis X2 by a respective angle substantially equal to the respective predetermined angle of rotation. The points in which the roller 29 maintains a condition of tangency with the profile of the surface portion 39 of the lever 30 during the rotation of the lever 20 about the rotation axis X1 and a rotation of the lever 30 about the rotation axis X2 by equal angle but in opposite direction are thus defined.

The curve that passes by all the reference points discussed above defines the profile of the surface portion 39 of the lever 30. Such a profile is therefore defined by a curve that passes by points that, for every rotation of the roller 29 (and therefore of the lever 20) about the rotation axis X1 by a certain angle, have undergone a rotation by equal angle about the rotation axis X2. The construction of the profile of the surface portion 39 with a shape equal to that of said curve ensures an identical angular rotation of the lever 20 about the rotation axis X1 and of the lever 30 about the rotation axis X2, and therefore an identical movement of the pads 21, 31 with respect to the rim of the wheel.

In order to trace the aforementioned curve, it is carried out as indicated below.

At all the reference points identified a horizontal stroke T is traced, as illustrated in FIG. 13.

Figure 14:
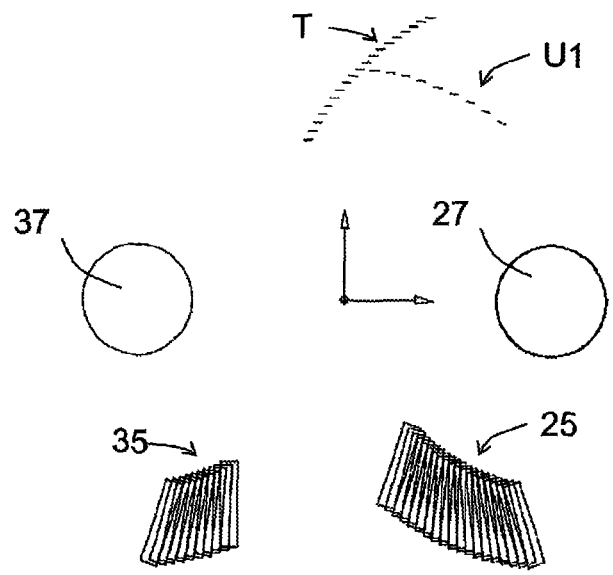
Figure 15:
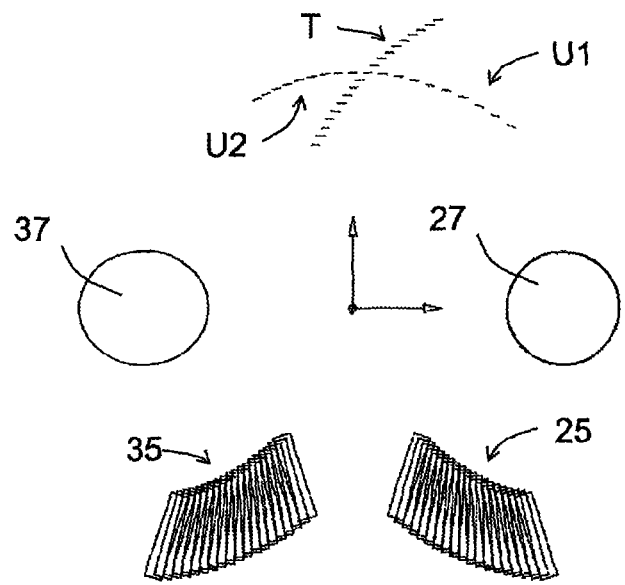

As illustrated in FIGS. 14 and 15, each stroke T is then rotated about the rotation axis X2 by an angle equal to the respective angle by which the roller 29 has been rotated. In particular, FIG. 14 illustrates the strokes U1 that correspond to the strokes T obtained by carrying out rotations of the roller 29 in clockwise direction (in the example, up to the angle of rotation of +10°), whereas FIG. 15 illustrates the strokes U2 that correspond to the strokes T obtained by carrying out rotations of the roller 29 in anti-clockwise direction (in the example, up to the angle of rotation of −10°). FIGS. 14 and 15 also show the positions taken by the support area 35 of the lever 30 for each of the aforementioned rotations about the rotation axis X2. In particular, FIG. 14 shows the positions taken by the support area 35 following rotations in clockwise direction about the rotation axis X2 (starting from the initial configuration shown in FIG. 11), whereas FIG. 15 also shows the positions taken by the support area 35 following rotations in anti-clockwise direction about the rotation axis X2. FIG. 15 thus indicates both the strokes U1 of FIG. 14 and the strokes U2.

Figure 16:
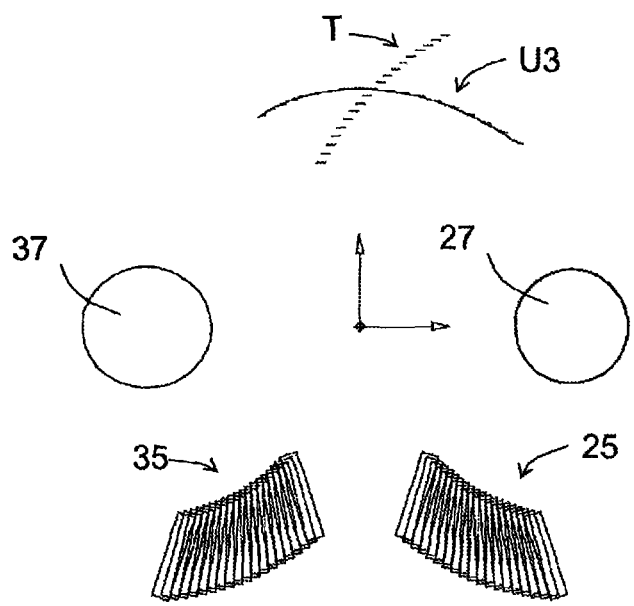

FIG. 16 indicates a curve U3 that passes by the initial points (i.e. those that are the most on the left in FIG. 16) of the strokes U1 and U2. Such a curve U3 defines the profile of the surface portion 39 of the lever 30.

The supplier thus takes care of constructing a lever 30 having the aforementioned profile having an identical shape to that of the aforementioned curve.

Of course, those skilled in the art can bring numerous modifications and variants to the invention described above, in order to satisfy specific and contingent requirements, all of which are in any case encompassed by the scope of protection of the present invention as defined by the following claims.

What is claimed is:

1. A bicycle brake, comprising a pre-assembled assembly configured to be mounted on a bicycle frame through two fastening pins, wherein said pre-assembled assembly comprises:

a first lever having an actuation arm for connection to an inner cable of a sheathed cable and a braking arm for supporting a first brake pad, said first lever being pivoted in a first rotation axis (X1) and comprising a first through hole coaxial to said first rotation axis (X1);

a second lever having an actuation arm for connection to a sheath of the sheathed cable and a braking arm for supporting a second brake pad, said second lever being pivoted in a second rotation axis (X2) distinct and substantially parallel to the first rotation axis (X1), said second lever comprising a second through hole coaxial to said second rotation axis (X2);
a support element of said first lever and second lever, said support element comprising a third through hole coaxial to said first rotation axis (X1) and a fourth through hole coaxial to said second rotation axis (X2);
a first hollow pin housed in said first through hole and in said third through hole and provided with a longitudinal cavity for passage of a first fastening pin of said two fastening pins to the bicycle frame; and
a second hollow pin housed in said second through hole and in said fourth through hole and provided with a longitudinal cavity for passage of a second fastening pin of said two fastening pins to the bicycle frame.

2. The brake according to claim 1, wherein the first hollow pin is rotatably housed in said first through hole and the second hollow pin is rotatably housed in said second through hole.

3. The brake according to claim 2, wherein each of said first hollow pin and second hollow pin comprises, at a first free end portion, a head for axial abutment against said first lever and said second lever, respectively, and, at an opposite free end portion thereof, an external threading engaged in an internal threading formed in said third through hole and fourth through hole, respectively.

4. The brake according to claim 3 wherein said pre-assembled assembly comprises:
a first hollow nut screwed onto the external threading of said first hollow pin;
a second hollow nut screwed onto the external threading of said second hollow pin.

5. The brake according to claim 4, wherein said pre-assembled assembly comprises at least one elastic element arranged pre-loaded between said support element and said first and second hollow nuts and active in thrust on said first lever and second lever.

6. The brake according to claim 5, wherein said at least one elastic element is at least partially housed in said support element.

7. The brake according to claim 6, wherein said at least one elastic element is defined by a single elastic element having a first portion arranged coaxially to said first rotation axis (X1), a second portion arranged coaxially to said second rotation axis (X2), an intermediate portion that connects said first portion and second portion, a first end portion active in thrust against the braking arm of said first lever in a direction away from the braking arm of said second lever and a second end portion active in thrust against the braking arm of said second lever in a direction away from the braking arm of said first lever.

8. The brake according to claim 2, wherein said pre-assembled assembly has a predetermined axial clearance between said support element and said first lever and second lever.

9. The brake according to claim 2, wherein said fastening pins are at least partially housed in said first through hole and second through hole, respectively.

10. The brake according to claim 2, wherein the braking arm of each of said first lever and second lever is made in a distinct piece from the respective actuation arm of each of said first lever and second lever, wherein said pre-assembled assembly comprises, for each of said first lever and second lever, means for adjusting the angular position of said braking arm with respect to said actuation arm.

11. The brake according to claim 10, wherein each actuation arm comprises a threaded through hole in which a screw is screwed, having a head projecting with respect to said actuation arm and an opposite end surface in abutment against the braking arm, so that a screwing/unscrewing action of said screw with respect to said threaded through hole causes a variation of the position of said braking arm with respect to said actuation arm.

12. The brake according to claim 1, wherein each of said first hollow pin and second hollow pin comprises, at a first free end portion, a head for axial abutment against said first lever and said second lever, respectively, and, at an opposite free end portion thereof, an external threading engaged in an internal threading formed in said third through hole and fourth through hole, respectively.

13. The brake according to claim 12, wherein said pre-assembled assembly comprises:
a first hollow nut screwed onto the external threading of said first hollow pin;
a second hollow nut screwed onto the external threading of said second hollow pin.

14. The brake according to claim 13, wherein said pre-assembled assembly comprises at least one elastic element arranged pre-loaded between said support element and said first and second hollow nuts and active in thrust on said first lever and second lever.

15. The brake according to claim 14, wherein said at least one elastic element is at least partially housed in said support element.

16. The brake according to claim 14, wherein said at least one elastic element is defined by a single elastic element having a first portion arranged coaxially to said first rotation axis (X1), a second portion arranged coaxially to said second rotation axis (X2), an intermediate portion that connects said first portion and second portion, a first end portion active in thrust against the braking arm of said first lever in a direction away from the braking arm of said second lever and a second end portion active in thrust against the braking arm of said second lever in a direction away from the braking arm of said first lever.

17. The brake according to claim 1, wherein said pre-assembled assembly has a predetermined axial clearance between said support element and said first lever and second lever.

18. The brake according to claim 1, wherein said fastening pins are at least partially housed in said first through hole and second through hole, respectively.

19. The brake according to claim 1, wherein the braking arm of each of said first lever and second lever is made in a distinct piece from the respective actuation arm of each of said first lever and second lever, wherein said pre-assembled assembly comprises, for each of said first lever and second lever, means for adjusting the angular position of said braking arm with respect to said actuation arm.

20. The brake according to claim 19, wherein each actuation arm comprises a threaded through hole in which a screw is screwed, having a head projecting with respect to said actuation arm and an opposite end surface in abutment against the braking arm so that a screwing/unscrewing action of said screw with respect to said threaded through hole causes a variation of the position of said braking arm with respect to said actuation arm.

21. A bicycle brake assembly comprising:
a first lever that supports a first brake pad, said first lever pivots on a first rotation axis (X1) and has a first through hole coaxial with said first rotation axis (X1);
a second lever that supports a second brake pad, said second lever pivots on a second rotation axis (X2) that is substantially parallel to said first rotation axis (X1), said second lever has a second through hole coaxial with said second rotation axis (X2);

a support element that supports said first lever and second lever and has a third through hole coaxial with said first rotation axis (X1) and a fourth through hole coaxial with said second rotation axis (X2);

a first hollow pin housed in said first through hole and in said third through hole and provided with a threadless longitudinal cavity extending entirely through said first hollow pin for passage of a first fastening pin of said pre-assembled assembly through to a bicycle frame; and a second hollow pin housed in said second through hole and in said fourth through hole and provided with a threadless longitudinal cavity extending entirely through said second hollow pin for passage of a second fastening pin of said pre-assembled through to a bicycle frame.

22. A bicycle brake, comprising a pre-assembled assembly intended to be mounted on a bicycle frame through two fastening pins, wherein said pre-assembled assembly comprises:

a first lever having an actuation arm for connection to an inner cable of a sheathed cable and a braking arm for supporting a first brake pad, said first lever being pivoted in a first rotation axis (X1) and comprising a first through hole coaxial to said first rotation axis (X1);

a second lever having an actuation arm for connection to a sheath of the sheathed cable and a braking arm for supporting a second brake pad, said second lever being pivoted in a second rotation axis (X2) distinct and substantially parallel to the first rotation axis (X1), said second lever comprising a second through hole coaxial to said second rotation axis (X2);

a support element of said first lever and second lever, said support element comprising a third through hole coaxial to said first rotation axis (X1) and a fourth through hole coaxial to said second rotation axis (X2);

a first hollow pin housed in said first through hole and in said third through hole and provided with a longitudinal cavity extending through an entire length of the first hollow pin for passage of a first fastening pin of said pre-assembled assembly through to a bicycle frame; and a second hollow pin housed in said second through hole and in said fourth through hole and provided with a longitudinal cavity extending through an entire length of the second hollow pin for passage of a second fastening pin of said pre-assembled through to a bicycle frame.

* * * * *